Figure 1:
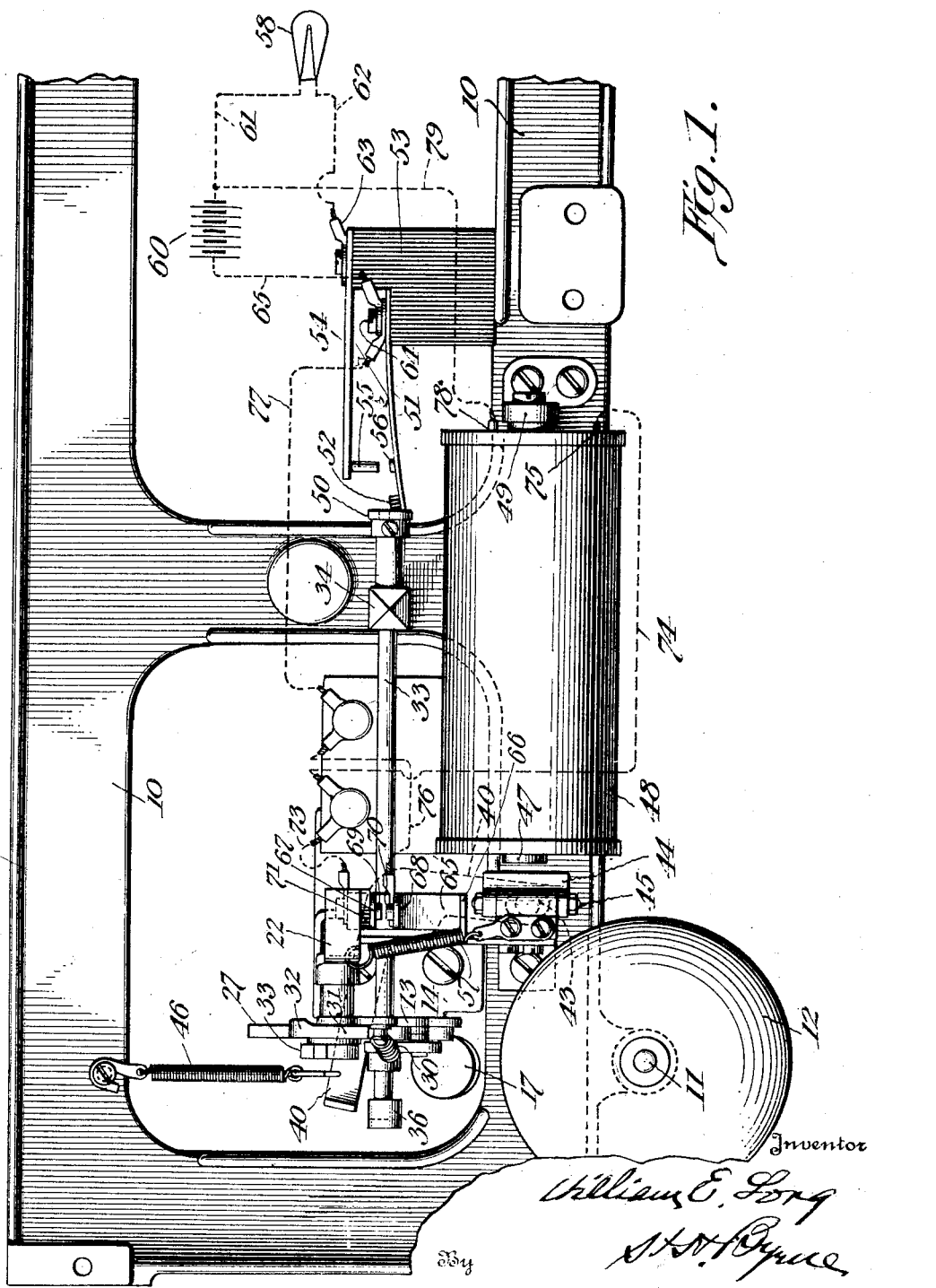

Feb. 17, 1931.  W. E. LONG  1,793,410
SIGNALING DEVICE FOR ADDING MACHINES AND THE LIKE
Filed July 28, 1928   3 Sheets-Sheet 1

Inventor
William E. Long
By
Attorney

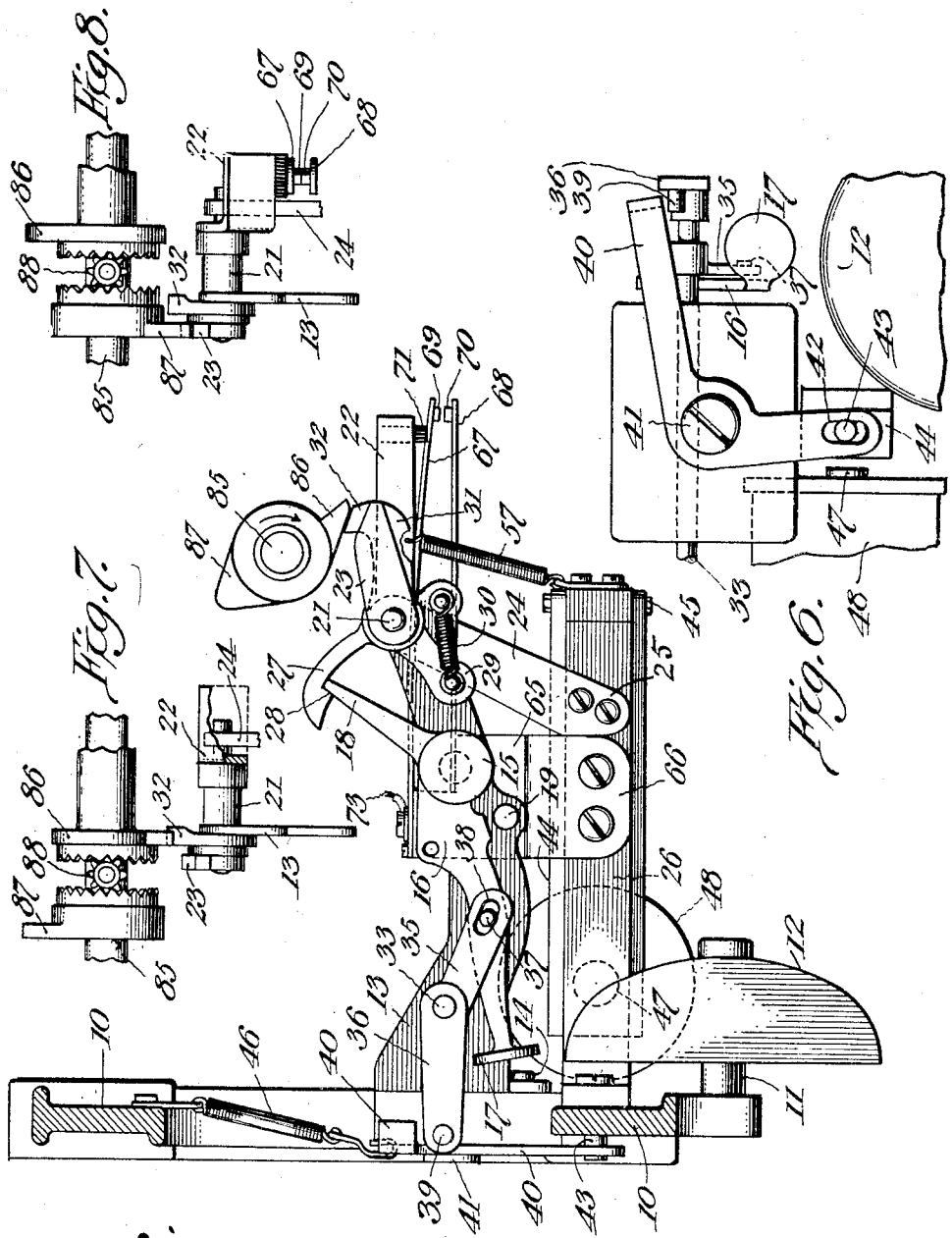

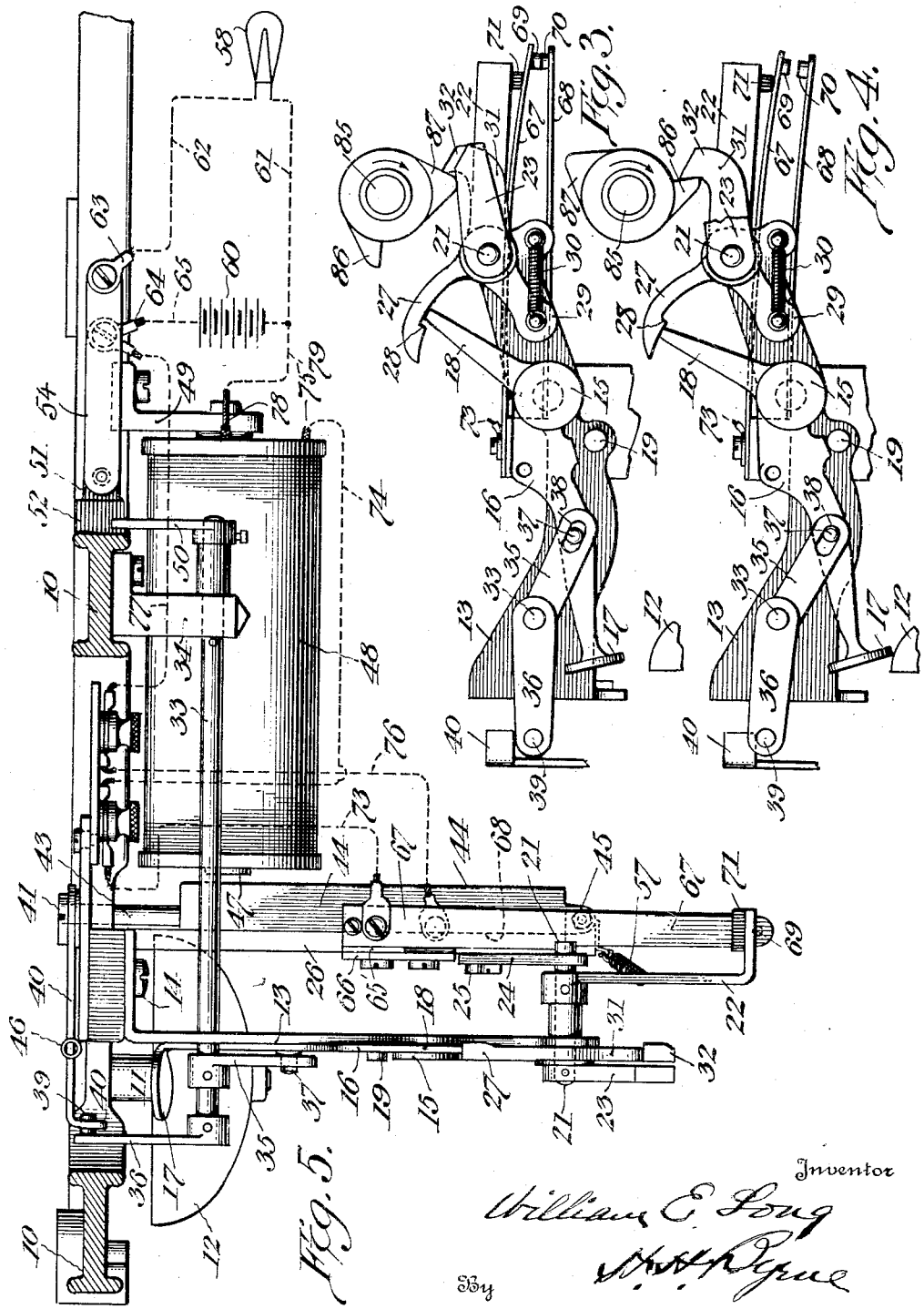

Patented Feb. 17, 1931

1,793,410

UNITED STATES PATENT OFFICE

WILLIAM E. LONG, OF NEW YORK, N. Y., ASSIGNOR TO R. H. MACY & CO., INC., OF NEW YORK, N. Y., A CORPORATION OF NEW YORK

SIGNALING DEVICE FOR ADDING MACHINES AND THE LIKE

Application filed July 28, 1928. Serial No. 295,923.

My invention relates to a device for automatically controlling both audible and visible signals on adding machines, totalizers, and registers, counters, or the like in connection with accounting or bookkeeping systems; and its main object is to give an unmistakable sign whenever any change is taking place, such as subtraction for overdraft made, or addition for overdraft displaced.

Systems now in use depend entirely on the operator's ability to heed signals at the proper time, but as the signals consist of a combination of different sounds, they are often incorrectly given or mistakenly understood, which causes errors in printed audit sheets, ledger cards, or pass books, depositors accounts, and so forth.

By the use of my invention in connection with the machines mentioned above, such errors are avoided because the operator is getting unmistakable warnings by sound and light every time a change in operation, such as from addition to subtraction, for instance, takes place on the machine, and if these warnings are heeded the entries are bound to be correct.

Some of the advantages and objects of the invention are here enumerated:

A. The device produces an audible sound giving to the operator information relating to existing totals or accounts.

B. It gives a visible signal by means of an electric bulb, for instance, indicating that certain computations or changes on the machines must be made.

C. It furnishes visible indications of additional debits or credits that may be posted simultaneously or used for future work.

D. It produces a visible signal indicating the home or starting position of the mechanism.

E. An important advantage gained by the use of this device is the complete elimination or great reduction of errors and false entries.

The invention is herein described as applied to posting registers with an adding and subtracting counter for the overdraft feature, and since such machines are quite generally known and universally used, they require no description in this specification other than with regard to elements cooperating with the present device.

One embodiment of my invention is illustrated in the accompanying drawings, wherein:

Figure 1 represents a front elevational view of the device.

Figure 2 an end elevation of Figure 1 seen from the left thereof with the hammer or striker in cocked position.

Figures 3 and 4 are views similar to Figure 2 with the hammer in its intermediary and striking positions respectively.

Figure 5 a top plan view of Figure 1 partly in section.

Figure 6 a partial rear view of Figure 1, and

Figures 7 and 8 show a portion of a register counter in subtracting and adding positions respectively.

In the drawings reference numeral 10 is the frame or so-called "register back" of the machine, and upon this frame the entire device is mounted. A bolt 11 near the bottom edge of the frame carries a bell 12 intended to give the audible signal. A bracket 13 extending forwardly at right angles from the frame 10 is secured on the latter by means of screws 14 and on a stud 15 secured in the frame is journalled a striker or hammer 16 with its head 17 at one end posed over the bell 12 ready to strike the same whenever released; while the other end of the striker terminates with a finger 18 pointing upwardly in a slanting direction adapted to be engaged by a catch 27. At 19 is shown an abutment or stop for limiting the downward or striking movement of the hammer 16, said abutment being fixed in the bracket 13. About midway between its head and the journal 15 the hammer 16 is provided with a stud 37 engaged by a slotted arm 35 the function of which is to raise the hammer after striking and move it into cocked position.

At the free end of the bracket 13 is journalled a short spindle 21 to which is pinned or in any other suitable manner secured a contact lever 22 near its right end, see Figure 5. This lever actuates a switch 69, 70, for closing a circuit for an electro-magnet, 48. On the left end of the spindle 21 an arm 23 is similarly secured, so that the spindle 21, the arm 23, and the lever 22 always turn together whenever the said arm is depressed by the action of a counter shaft cam on the arm 23. A bearing piece 24 engages the inner or right end of the spindle 21 to give it support and this bearing piece is firmly secured by means of screws 25 to a second bracket 26 also bolted to the frame 10 and extending therefrom parallel to the first bracket 13. A tension spring 57 having one end attached to the bracket 26 and its other end to the lever 22 tends to turn the latter together with the shaft 21 and the arm 23 in clockwise direction so as to lightly touch the switch without actually closing it.

Freely moving on the spindle 21 is the catch 27 referred to above and provided with a square notch 28 intended normally to engage with the end of the finger 18 to hold the hammer 16 in lifted position, as already described, see Figure 2. This catch 27 has a tail piece 29 carrying one end of a tension spring 30, the other end of which is attached to the bracket 13, thereby continually tending to turn the catch in counter-clockwise direction, see Figure 2, in order to hold it in engagement with the finger 18. The catch 27 has also an arm 31 extending in the same direction as the arm 23 and terminating with a broad nose 32 the function of which is to close the switch 69, 70, as already stated, when actuated by the cam 87 of the counter shaft 85 on the adding or similar machine.

A shaft 33 running parallel with the frame 10 is journalled in the bracket 13 as well as in a bearing block 34 which is bolted to the frame. On this shaft are rigidly secured two arms 35 and 36, one of which 35 reaches in the direction of the hammer, engaging a stud 37 thereon by means of a slot 38 formed in the end of the arm 35, as described above. The other arm 36 has a pin or stud 39 adapted to intermittently engage one end of a bell crank 40 fulcrumed at 41 in the frame 10. The other arm of the crank has a slot 42 (Figure 6) slidably engaging a finger 43 at the free end of an armature 44 which is hinged as at 45 (Figure 5) to the second bracket 26 to swing horizontally or in a plane at right angles to that in which the bell crank swings. By means of a tension spring 46 (Figure 2) having one end attached to the frame 10 and the other to one arm of the bell crank 40, said arm is swung upwards and the armature 44, through the intermediary of the other crank arm and the finger 43, swung into its normal position away from the core 47 of the electro-magnet 48. This magnet is secured to the frame 10 by means of a bracket 49.

At the right end of the shaft 33, as seen in Figures 1 and 5, is secured a short lever 50, the end of which is constantly pressed upwards by a flat spring 51 having an insulating piece 52 at its end inserted between the lever 50 and itself. This spring accordingly acts to turn the lever 50 together with the shaft 33 and the arms 35 and 36 in clockwise direction as seen in Figure 2 but is normally, or as long as the hammer is held in cocked position (Figure 2) restricted from turning completely to close the light switch 55, 56. The spring is secured to an insulating block 53 fixed on the frame 10 and above the spring and insulated therefrom is similarly fixed on said block a metal tongue 54, provided with the contact point 55 situated oppositely to the corresponding contact point 56 of said switch on the flat spring 51. With the hammer 17 held in cocked position, through the engagement of the catch 27 with the hammer finger 18, the points 55 and 56 are out of contact, see Figures 1 and 2. When the hammer is released by the catch 27, the flat spring 51 actuating the lever 50 swings the hammer head 17 down against the bell 12, sounding the latter, through the intermediary of shaft 33, arm 35 and stud 37 and at the same time bringing the points 55 and 56 into contact thus closing the circuit for the lamp 58. The electric current then runs from the battery 60, or any other source of electric power, over conductor 61 to the lamp 58 and back over conductor 62, terminal 63, metal tongue 54, contact points 55, 56, spring 51, terminal 64 and conductor 65 back to the battery 60. Thus the bell rings and the lamp glows simultaneously.

On an insulating block 65 supported from the second bracket 26 by a plate 66, a pair of contact fingers 67, 68 are spacedly secured, one above the other. These fingers are provided with oppositely disposed contact points 69, 70, above referred to. The upper finger 67 with its contact point 69 is controlled by the lever 22, the free end of which has an insulating tooth 71 which normally rests lightly upon the finger 67 but without closing the switch, that is to say the contact points 69 and 70 are held separated. The upper finger 67 is, through conductors 73 and 74, connected to one pole of the electro-magnet 48 as at 75, while the lower finger 68 through conductors 76 and 77 is connected through the terminal 64 and the conductor 65 to one pole of the battery 60, the other pole of which connects with the pole 78 of the electro-magnet 48 through the conductor 79. Accordingly when the arm 23 is being turned in clockwise direction, see Figure 2, turning the shaft 21 and the lever 22 with it, the contact finger 67 will be bent toward the finger 68 thus making contact between the points 69 and 70, as indicated in Figure 3. This then closes the circuit from the battery 60 through the electro-magnet 48 and energizes its core 47 which thereupon attracts the armature 44 which swings horizontally on its hinge 45 carrying the depending arm of the bell crank 40 with it. Accordingly the horizontal arm of the latter descends upon the arm 36 thereby turning it and the shaft 33 counter-clockwise together with the lever 50, Figures 1 and 5, which thus lowers the end of the spring 51 and opens the contact between the points 55 and 56, thereby interrupting the lamp circuit and extinguishing the lamp 58. Simultaneously the arm 35, Figure 2, is turned counter-clockwise by the shaft 33 and through its engagement with the stud 37 lifts the hammer head 17, thereby pressing the end of finger 18 into engagement with the notch 28 of the catch 27 so that the hammer will be restored into its cocked position.

As soon as the arm 23 is released, the arm 22 will be raised by the contact spring 67 and the switch 69, 70 opened, thus breaking the circuit for the magnet 48. Actuated by the spring 46 the bell crank 40 will now swing the armature 44 away from the inactive core 47 of the magnet. This is the position of the apparatus at rest or its starting position, as seen in Figures 1 and 2, namely: the hammer cocked; the lamp 58 extinguished because of the break in the circuit at 55, 56; the magnet 48 dead, because of open switch at 69, 70; and the armature 44 retracted from the core 47.

As has been previously stated in this description this device is intended to cooperate with and be actuated by a cash register or similar machine provided with an adding and subtracting counter of the usual construction, but forming no part of the present invention. A portion of such a counter is here illustrated in Figures 7 and 8 and comprises a shaft 85 which is axially displaceable a certain distance. Upon this shaft are mounted a pair of freely revoluble cams 86 and 87, which are inter-connected by a set of gears 88 so as to revolve together but in opposite directions. The cam 86 acts as "trip cam" (see Figures 4 and 7), lifting the notch of the catch 27 thus releasing the hammer to strike the bell and simultaneously lighting the lamp, through the added turning of shaft 33 and closing the switch 55, 56, Figure 1. The cam 87 is the "resetting cam" operating the pawl 23 for restoring the parts into the starting position of the device (see Figures 3 and 8).

Operation

In order to make an overdraft or subtraction the countershaft 85 is shifted axially until the trip cam 86 stands exactly opposite and above the nose 32 of the catch 27 while the cam 87 is situated a short distance to the left of the arm 23 (see Figures 2 and 7). At this time both switches at 55, 56 and 69, 70 are open, the hammer 16 in cocked position and the armature 44 retracted. The trip cam 86 is then rotated in clockwise direction, Figure 2, thereby depressing the nose 32 and swinging the catch 27 in the same direction out of engagement with the hammer finger 18. The hammer now being free turns counter-clockwise on its journal 15 until its head 17 strikes the bell 12, the stop 19 limiting its downward movement, Figure 4. This turning of the hammer is caused by the spring 51 pressing against the end of the lever 50 thereby turning the shaft 33 and the arm 35 clockwise. This arm engaging the stud 37 on the hammer 16 then actuates the latter to strike. At the same time the spring 51 makes engagement between the points 55 and 56, and the turning of shaft 33 closes the lamp circuit permitting current to pass from battery 60 through conductor 61, lamp 58, conductor 62, terminal 63, tongue 54, contact points 55, 56, spring 51, terminal 64 and conductor 65 and back to battery. The lamp 58 will thus glow simultaneously with the sounding of the bell. The parts then take the position shown in Figure 4 with the catch 27 resting upon the finger 18 but without holding it back. The restoring arm 36 partaking in the clockwise turning of the shaft 33 now raises the adjacent end of the bell crank 40 by means of its pin 39 and assisted by the spring 46. In doing this the other arm of the crank 40 which engages the finger 43 of the armature 44 retracts the latter from the core 47 of magnet 48, see Figure 6.

To cock the bell hammer and extinguish the light when an overdraft has been displaced, or an addition has been made or when all registrations have been set back to their normal or starting position from its striking position Figure 4, the counter 85 is positioned so that the restoring cam 87 registers with the pawl 23 (see Figures 3 and 8) and with the cam 87 turning in either direction it causes the arm 23 to turn clockwise, Figure 3. As a consequence the shaft 21 and the contact lever 22 both turn with it and the insulating tooth 71 pressing on the contact finger 67 establishes contact between the points 69, 70, thus closing the magnet circuit. The current thus passes from the battery 60 through conductor 79 to one pole of the magnet 48 at 78 and out again at the other pole 75, through conductors 74, 73, contact fingers and points 67, 69, 70 and 68, conductors 76, 77, terminal 64 and conductor 65 back to the battery. The magnet thus energized the core 47 attracts the armature 44 which then swings the bell crank 40 thereby depressing the end of the restoring arm 36 which in turn revolves the shaft 33 with the lever 50 in counter-clockwise direction. As a consequence the lamp 58 is extinguished through the breaking of the contact between points 55 and 56 when the lever 50 depresses the spring 51 and opens the circuit. As the arm 35 turns counter-clockwise, see Figure 3, with the shaft 33, it lifts the hammer 16, 17 through its engagement with the stud 37 and throws the finger 18 clockwise back of the notch 28. The tension spring 30 actuating the tail piece 29 on the catch 27 now turns the latter counter-clockwise, depressing the notch 28 into position to intercept the end of the hammer finger 18 as seen in Figure 3 and also lifts the nose 32 into position ready for engagement with the tripping cam 86. As soon as the cam 87 has rotated past the pawl 23, the latter is turned counter-clockwise through the upward pressure of the contact finger 67 thereby opening the contact between points 69 and 70 and breaking the circuit from the battery 60 to the magnet 48, disengaging the latter. Finally the tension spring 46 operates the bell crank 40 and raises its horizontal arm, the other arm thereof retracting the armature 44 through its hold on the finger 43. The apparatus is now restored to its normal or starting position as seen in Figure 2.

It will be evident that many changes in construction and arrangement of parts will be possible within the scope of the claims and the right of making such changes are reserved.

Note should be taken that the apparatus functions equally as well as a visible signal alone or as an audible signal alone. That is to say, either the bell or the lamp may be omitted. If, for instance, a light signal alone is desired the bell 12 and the hammer head 17 are omitted, when the lamp 58 will glow whenever connections are made, as already described. Similarly the audible signal will be given if the lamp 58, with its circuit and the metal tongue 54 were omitted, no other change of parts or operation being necessary.

What is claimed as new is:

1. In a registering mechanism having a signaling apparatus therefor comprising a bell, the combination of a shaft, a member adapted to strike the bell, connections between said shaft and the bell striking member, a spring arm normally tending to turn the shaft and operate the bell striker, and a cam released trip having connections with the bell striker and holding the shaft against turning, substantially as set forth.

2. Operating means for a registering mechanism having a signaling apparatus therefor comprising a lamp, said means including a shaft, electrical means for lighting the lamp including a switch, said switch engaging and normally tending to turn the shaft, and means normally tending to hold the shaft against turning including a cam released trip operable through the registering mechanism, substantially as set forth.

3. In a registering mechanism having dual signaling devices therefor comprising a bell and a lamp, the combination of a shaft, a bell striker, connections between said shaft and the bell striker, electrical means for lighting the lamp including a switch, said switch engaging and normally tending to turn the shaft, and means normally tending to hold the shaft against turning including a cam released trip operable through the registering mechanism and having connection with the bell striker, substantially as set forth.

4. In a registering mechanism having dual signaling apparatus therefor comprising a bell and a lamp, the combination of a shaft, a bell striker, operative connections between said shaft and the bell striker, a spring arm normally tending to turn the shaft, operative connections between the spring arm and the lamp, and a cam released trip operable through the registering mechanism and connected to the bell striker normally withholding the shaft against turning, substantially as set forth.

5. In a registering mechanism having audible and visible signaling devices therefor, the combination of a shaft, a striker for the audible signal, operative connections between said shaft and the striker, a spring tensioned member normally tending to rotate the shaft, operative connections between said spring tensioned member and the visible signal device, and a cam released trip associated with the striker normally holding the shaft against turning, substantially as set forth.

6. In a registering mechanism having audible and visible signaling devices therefor comprising a bell and a lamp, the combination of a shaft, a striker for the bell, operative connections between said shaft and the striker, a spring tensioned arm engaging and normally tending to turn the shaft, a battery and circuit closer associated with said spring arm and the lamp, and a cam released trip associated with the striker normally holding the shaft against turning, substantially as set forth.

7. In a registering mechanism having audible and visible signaling devices therefor comprising a bell and a lamp, the combination of a shaft, a striker for the bell, an arm on the shaft adapted to actuate the striker, a lever mounted on the shaft, a spring arm engaging said lever and normally tending to turn the shaft, a battery and circuit closer associated with the spring arm and the lamp, and a cam released trip connected with the striker and normally holding the shaft against turning, substantially as set forth.

8. In a registering mechanism having a signaling device therefor comprising a shaft, the combination of means normally tending to turn the shaft, operative connections between said shaft and the signal device, a cam released trip connected with the signal device and normally holding the shaft against turning; a restoring apparatus including a switch and a magnet, a cam actuated pawl operable to close the switch and energize the magnet, and operative connections between the magnet and said shaft, substantially as set forth.

9. In a registering mechanism having a signal device therefor comprising a lamp, the combination of a shaft, means normally tending to turn the shaft, a cam released trip device normally holding the shaft against turning, electrical connections between the lamp and said shaft turning means, and a restoring apparatus including a magnet, a cam actuated pawl, electrical and mechanical connections between said magnet and the cam actuated pawl, an armature for the magnet, and operative connections between said armature and the shaft, substantially as set forth.

10. In a registering mechanism having an audible signal device therefor comprising a bell, and a bell striker, the combination of a shaft, means normally tending to turn the shaft, a cam released trip normally holding the shaft against turning, connections between said cam trip, the bell striker and the shaft, and a restoring apparatus including a cam actuated pawl, a magnet, electrical and mechanical connections between said magnet and the cam actuated pawl, an armature for the magnet, and operative connections between said armature and the shaft, substantially as set forth.

11. In a registering mechanism having an audible signal device therefor comprising a bell, and a bell striker, the combination of a shaft, means normally tending to turn the shaft, a cam released trip normally holding the shaft against turning, connections between said cam trip, the bell striker and the shaft, and a restoring apparatus including a cam actuated pawl, an armature, a bell-crank lever actuated by the armature, arm and lever connections between the bell-crank lever and the shaft, and electrical connections between said magnet and the cam actuated pawl, substantially as set forth.

12. In a registering mechanism, having audible and visible signaling devices therefor comprising a bell and a bell striker, the combination of a shaft, means normally tending to turn the shaft, a cam released trip, connections between said cam trip, the bell striker and the shaft normally holding the shaft against turning, a lamp associated with and controlled by said shaft turning means; and signal restoring mechanism including a cam actuated pawl, a magnet, an armature, a bell-crank lever actuated by the armature, arm and lever connections between the bell-crank lever and the shaft, and electrical connections between said magnet and the cam actuated pawl, substantially as set forth.

In witness whereof, I have hereunto set my hand at New York city, New York, this 16th day of July, A. D. nineteen hundred and twenty-eight.

WILLIAM E. LONG.